Figure 1:
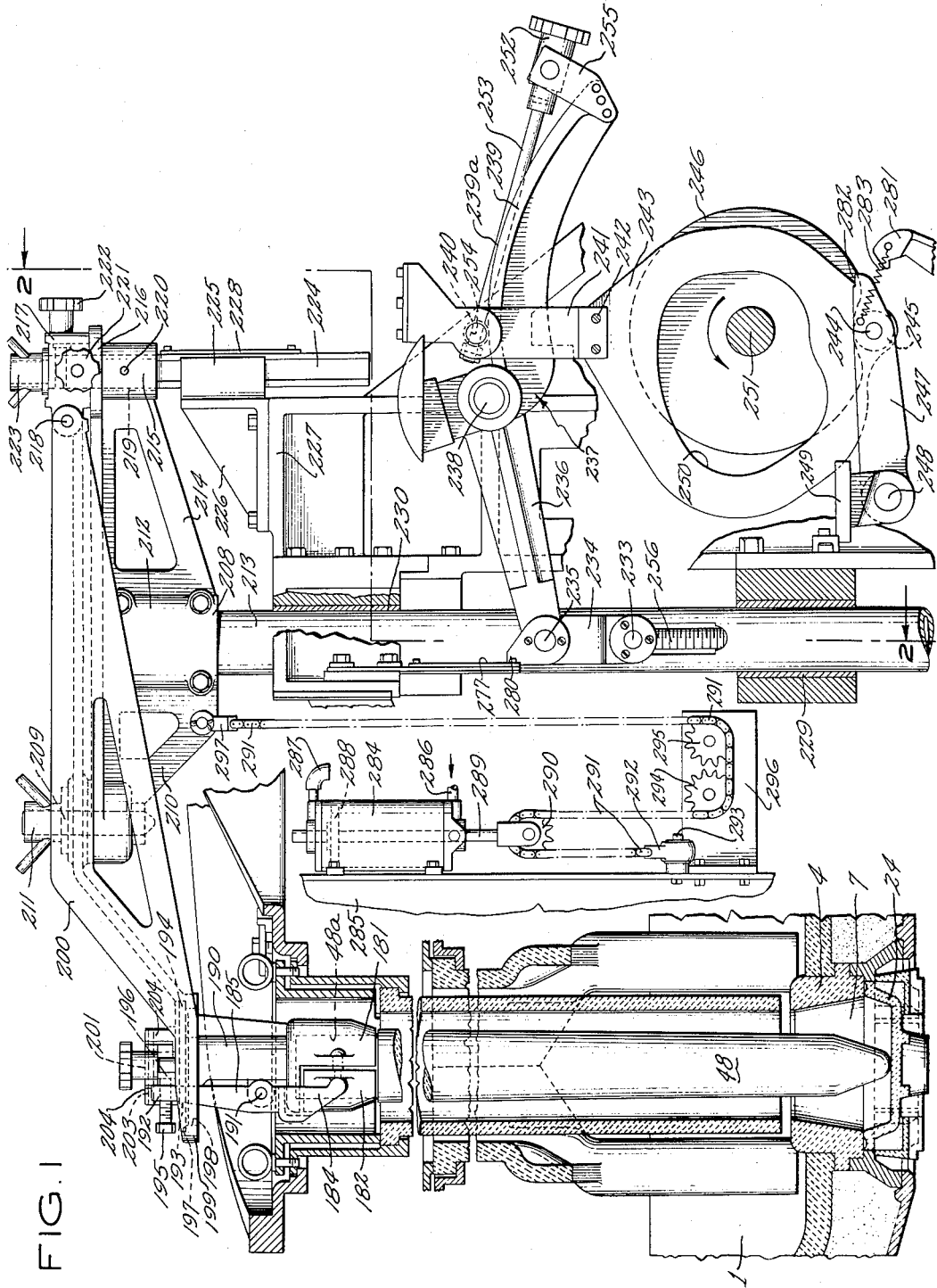

June 12, 1956 K. E. PEILER 2,749,665
MEANS FOR SUPPORTING AND OPERATING A GLASS FEEDER
VERTICALLY RECIPROCABLE IMPLEMENT
Original Filed April 21, 1949 2 Sheets-Sheet 1

INVENTOR
KARL E. PEILER
BY *Parham + Batts*
ATTORNEYS

United States Patent Office 2,749,665
Patented June 12, 1956

2,749,665

MEANS FOR SUPPORTING AND OPERATING A GLASS FEEDER VERTICALLY RECIPROCABLE IMPLEMENT

Karl E. Peiler, West Hartford, Conn., assignor to Emhart Manufacturing Company, a corporation of Delaware Original application April 21, 1949, Serial No. 88,869, now Patent No. 2,654,184, dated October 6, 1953. Divided and this application December 24, 1951, Serial No. 263,075

2 Claims. (Cl. 49—55)

This application is a division of my co-pending application for Letters Patent for improvements in glass feeding apparatus, filed April 21, 1949, Serial No. 88,869, on which U. S. Patent No. 2,654,184 issued October 6, 1953, and is filed for the purpose of claiming the invention disclosed therein as embodying novel means for supporting and operating a vertically reciprocable implement, sometimes termed a "plunger," in relation to a glass discharge outlet in the bottom of a container for molten glass into which the implement depends.

An object of the invention of the instant application is to provide an extremely rugged feeder implement supporting and operating mechanism having adjustments that can be made conveniently and easily during operation and are of sufficient range to meet all possible operating conditions.

Another object of the invention is the provision of an improved cam-actuated and controlled mechanism for supporting and reciprocating the vertical implement of the feeder relative to the glass discharge outlet in the bottom of the feeder container so as to assure steady strokes of the implement under all operating conditions.

A further object of the invention is the provision in a cam-actuated and controlled feeder implement operating mechanism of the character described of a means to subject the implement to a substantially constant downward force of substantial amount beyond that caused by the weight of the implement and its supporting means, whereby to prevent bouncing of the cam follower of the mechanism on the periphery of its cam when the implement is being reciprocated at high frequency and also to aid downward strokes of the implement when it is of relatively large diameter and is being reciprocated slowly in glass that is relatively cold and viscous, as in the feeding of heavy-weight charges.

Other objects and advantages of the invention will be pointed out in or be obvious from the following description of a practical embodiment thereof as shown in the accompanying drawings. This description consists of the pertinent portions of the specification of my aforesaid co-pending application, Serial No. 88,869, and the accompanying drawings show the structures of Figs. 6 and 13, respectively, of the parent application.

Figure 2:
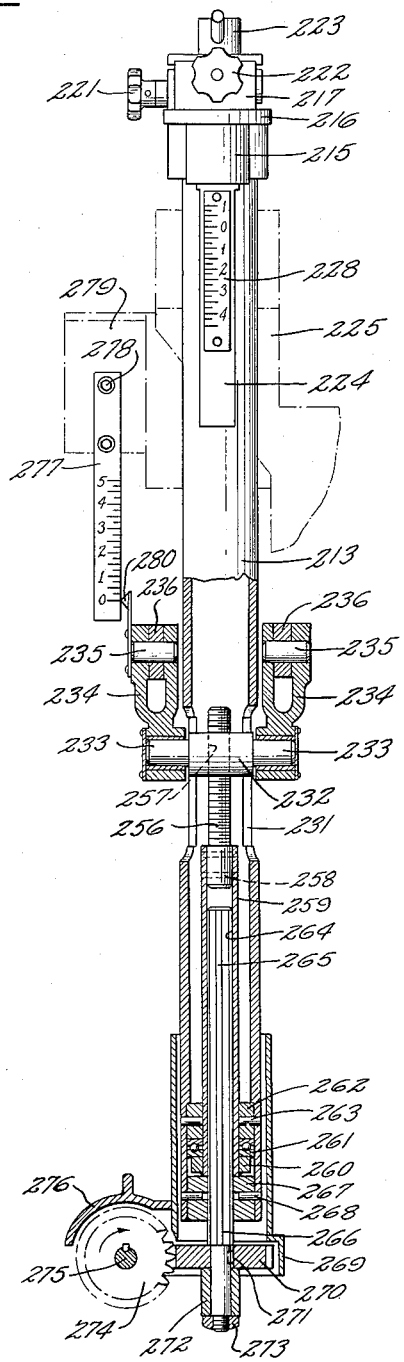

In the drawings:

Fig. 1 is a partial view, showing a feeder bowl outlet structure and glass homogenizing and feed controlling means in transverse vertical section and showing in elevation the means for mounting and vertically reciprocating a vertical plunger which is included in the homogenizing and feed controlling means; and Fig. 2 is a view partly in elevation and partly in vertical section, substantially along the line 2—2 of Fig. 1.

The refractory plunger 48 is suspended from a chuck which, as seen in Fig. 1, comprises a generally cylindrical lower portion comprising a main clamping part 181 and a segment movable cooperative clamping part 182. These two clamping parts together embrace and grip the upper end portion 48a of the plunger when the movable part 182 is pressed by a lower end portion 184 of a clamp lever 185 against the plunger upper end portion in the main clamping part 181.

The main clamping part 181 is suspended by an integral vertical shank 190. The clamp lever 185 is pivoted at 191 intermediately to the shank 190 so that its upper end portion, indicated at 192, projects upwardly through a radial notch 193 in a flat circular head 194 formed on the upper end of the suspension shank 190. A thrust bolt 195 is threaded through the upper end portion of the lever to bear against an upstanding central boss 196 on the head 194. The head 194 rests in a counter-bored seat 197, formed as the upper part of a chuck accommodating opening 198 defined by an annular outer end portion 199 of a plunger carrying, overhanging arm 200.

A hold-down lever 201, carried by a pair of upstanding ears 204 on the ring-shaped end portion 199 of the arm 200 bears downwardly on the boss 196 on the head 194 to prevent unintended upward displacement of the latter from its seated position in the outer end of arm 200.

The plunger carrying arm 200 preferably is of truss-like formation and shape, Fig. 1, so as to provide relatively great strength and rigidity without correspondingly increased weight. This arm is not likely to warp in service because of temperature changes.

The arm 200 is mounted on a saddle bracket 208 for limited longitudinal sliding movements relative to and for angular swinging movements about the axis of a vertical upwardly projecting pin 209, on a laterally projecting arm 210 of the saddle bracket 208. The adjusted position of the arm 200 relative to the stud 209 on this bracket may be maintained by tightening a nut 211. The intermediate portion of the saddle bracket 208 is formed as a split vertical collar 212 secured in a conventional manner on the upper end of a vertical tubular supporting shaft 213. The saddle bracket includes an arm 214 projecting oppositely to the arm 210 and formed at its outer end to provide a vertical collar portion 215 surmounted by a flat flange 216 on which rests a generally square frame member 217. This is attached by a transverse pivot element 218 to the adjacent end of the plunger carrying arm 200. A vertical shaft 219 is secured, as by a pin 220, in the vertical collar 215 so as to project upwardly through the frame 217. The latter is provided at one side with an adjusting screw 221 and at its rear or in line with the arm 200 with an adjusting screw 222. These cooperate with the shaft 219 and with the frame so that manual actuation of the adjusting screw 221, when the nut 211 has been loosened, will have the effect of swinging the arm 200 angularly in one or the other of opposite directions about the axis of the pin 209. This is a centering adjustment of the suspended refractory plunger 48 in relation to the feed bowl outlet 7. The feed bowl, designated 1, is partially shown and is provided with an orifice ring 24 operatively positioned at the lower end of outlet member 4. When the adjusting screw 222 is operated while the nut 211 is loose, the arm 200 will be adjusted longitudinally, this also being a centering adjustment of the plunger 48. When such adjustments have been completed, the nut 211 will be tightened and a nut 223 on the upper end of the shaft 219 may be tightened to maintain the adjustments.

The shaft 219 carries a depending guide bar 224 working in a vertical guideway 225 on a bracket 226 carried by a fixed framework 227. This prevents swinging of the saddle bracket 208 about the axis of its vertical shaft 213. Also, as best seen in Fig. 2, the guide bar 224 carries a vertical linear scale strip 228 cooperative with the upper edge of the guideway 225 as an index element or with any other suitable index element to show the height above the feed bowl outlet of the lower end of the plunger at a particular time in a cycle of reciprocation of such plunger.

The vertical tubular shaft 213 works in vertical bearings 229 and 230, Fig. 1, carried by the framework. This tubular shaft is transversely slotted at 231, Fig. 2. A pin 232 extends transversely through the slotted portion of the tubular shaft 213 and is vertically slidable therein. The opposite ends of this pin 232 project from opposite sides of the tubular shaft and may be slightly reduced in diameter as indicated at 233. They serve as trunnions on which the lower ends of links 234 are mounted. The upper ends of these links are connected by pivot pins 235 to integral forks 236 at one end of a plunger stroke lever 237, Fig. 1, which is fulcrumed intermediately on a horizontal pivot shaft 238 carried by the fixed framework. The lever 237 has its opposite end portion, indicated at 239, formed to define an arcuately curved upper surface 239a. A roller or slide block 240 rides on this arcuately curved upper surface, being mounted between a pair of side bars 241 which straddle the lever member 239. The bars 241 also straddle and are secured, as by screws 242, Fig. 1, to the upper part of a vertically edgewise plate 243, the lower portion of which is pivotally connected to a short shaft 244 which supports a cam roller 245 against the periphery of a plunger cam 246 and mounts such roller on the outer end portion of a cam roll lever 247. The latter is fulcrumed at one end of a horizontal shaft 248 carried by a bracket 249 on fixed framework. The plate 243 is centrally apertured at 250 to afford clearance for a shaft 251 on which the cam 246 is supported and for any adjacent structural parts at all the different positions to which the plate 243 may be moved by rotation of the cam 246.

The plate 243, the side bars 241 and the roller 240 riding on the upper surface of the part 239 of the plunger stroke lever 237 constitute the plunger stroke linkage. The curvature of the surface 239a of the part 239 of the stroke lever conforms to an arc having its center at the center of the plunger cam roller 245 when the latter is on the portion of the cam periphery of minimum radius. Therefore, as the plunger linkage is adjusted by means hereinafter pointed out, the increase or decrease in the amplitude of the plunger stroke is always at the upper end of the plunger movement, the lower limit being unchanged. Adjustment of the amplitude of the cam actuated stroke of the plunger is effected by moving the roller 240 along the arcuately curved upper surface 239a of the outer arm 239 of the stroke lever. This is accomplished by turning a handle portion 252 of an adjusting rod 253 which is in threaded engagement at 254 with a threaded transverse hole through the middle portion of the roll 240, the handle portion 252 of such adjusting rod being mounted at 255 on the outer end of the lever arm 239 so that it may be turned about its axis without longitudinal movement to effect the desired longitudinal adjustment of the roller 240 along the surface 239a of the lever arm.

Rotation of the cam 246 and actuation of the stroke lever will cause vertical reciprocation of the hollow shaft 213 by reason of an operative connection of the transverse pin 232, Fig. 2, with the tubular shaft. As is apparent from this view, a threaded rod 256 within the shaft 213 is threaded through a vertically positioned diametrical threaded opening 257 in the middle portion of the pin 232. The threaded rod 256 has its lower end portion disposed within and pinned at 258 to an inner tubular mmeber 259 which is disposed within the lower portion of the tubular shaft 213. The inner tubular member 259 has a collar 260 secured thereon at or adjacent to its lower end in any suitable manner or such collar might be integral therewith. Above this collar is a thrust bearing 261 surmounted by a collar 262, loose on the inner tube 259 but fastened to the tubular shaft 213, as by pins 263. The inner tubular member 259 is provided with longitudinally extending internal grooves 264 slidably engaging longitudinal splines 265 on a relatively fixed position rotary vertical adjusting rod 266. This adjusting rod is surrounded below the fixed collar 260 on the inner tube by a collar 267 in which the rod 266 may turn loosely, the collar 267 being secured to the tubular shaft 213, as by pins 268. The rod 266 depends below the lower end of the tubular shaft 213 into a tubular housing 269 for a worm gear 270 which is keyed at 271 to such shaft and rests upon a spacing sleeve 272 supported by a nut 273 screwed onto the extreme lower end of the shaft. The gear 270 is in mesh with a gear 274 on an adjacent shaft 275 in an annex 276 of the housing 269. With the construction described, turning of the gear 274 turns the gear 270 which in turn turns the vertical shaft 266. The inner tube 259 and its connected adjusting rod 256 are thus turned and are moved vertically relative to the adjusting rod 266. This will have the effect of adjusting the tubular shaft 213 vertically since the transverse pin 232 is held against vertical movement by its connection through the stroke lever and linkage with the cam roll on the periphery of the cam. Adjustment of the tubular shaft upward is from the inner tubular member 259 through its collar or flange 260 to the superimposed bearing unit 261, the collar 262 and the pin connections of the latter with the tubular shaft 213. The effect of the vertical adjustment of the tubular shaft 213 is to vary the position of the path of the vertical reciprocatory movements of the plunger as they are effected by rotation of the plunger cam.

Adjusting shaft 275 may be turned about its axis by a conveniently located handle or a remote control attachment (not shown).

A linear measurement scale strip 277 is fastened, as at 278, to a fixed framework part 279 in adjacent cooperative relation to an index element 280 on the adjacent link 234, this index element indicating the amplitude of the plunger strokes for any given adjustment of the collar 240, Fig. 1, along the upper surface of the arm 239 of the stroke lever, the reading being at zero when the cam roll 245 is on the lowest portion of the periphery of its cam.

The plunger supporting and operating mechanism just described provides accurate lateral adjustment of the position of the plunger in a variety of individually different directions in relation to the feed bowl outlet and also provides adequate working adjustments of the position of the path of reciprocatory movements of the plunger and of the amplitude of the plunger strokes.

The feeder plunger may be moved upwardly to a position slightly above the upper end of its upward stroke by the cam 246 and latched out of operation in that position by a pivoted latching hook, the bill portion of which is shown at 281. The latching hook is spring-tensioned and may be hooked over a notched outer end portion 282 of the plunger cam roller lever 247 when the latter has been moved to the position that it assumes when the cam roller is on the highest portion of the cam 246 and thereafter actuated further to pull the lever 247 to a latched-out position clear of the cam. When plunger operations are to be resumed, the latch-out hook is actuated to release the lever 247 in a position at which it will be engaged by the highest portion of the cam and thereafter the hook is maintained in its inactive position clear of the lever against the tension of the spring 283, as shown in Fig. 1.

The plunger operating mechanism also includes a mechanism to exert a substantially constant downward force of, for example, about 100 pounds on the vertically movable plunger carrying arm. This will assure the cam roller always following the entire periphery of its cam without any bouncing on such periphery, as heretofore has sometimes occurred when the plunger is being reciprocated at high frequency or is being operated at an extremely slow speed for the feeding of heavyweight charges. A slight failure of the cam roller to follow the cam causes variations in the weight of the charges. This is likely to occur in high speed operations when the movement of the plunger is very rapid. Also, on heavy-weight slow speed jobs, a large diameter plunger is used and the glass is relatively cold and viscous and frequently presents considerable resistance to the downward movement of the plunger. The downward pull by the means just referred to has no inertia at either end of the stroke and, therefore, is preferable to increasing the weight of the plunger mechanism.

The plunger pull-down mechanism comprises a vertical air cylinder 284, Fig. 1, supported on the fixed framework 285 in a relatively elevated position. An air intake conduit 286 communicates with the lower end of this cylinder and an exhaust tube or vent 287 may communicate with the upper part of such cylinder. A piston 288 is movably mounted in the cylinder and has a rod 289 depending below the cylinder and carrying an idle sprocket 290 over which is trained a chain 291. One end portion of this chain is attached to a suitable relatively fixed attaching element, as to an eye member 292 pivoted on a stud 293 projecting from the stationary framework 285 at a level well below the cylinder 284. The chain 291 at the side of the sprocket 290 remote from the attaching element 292 extends downwardly to a level slightly below the latter and then passes underneath a pair of horizontally spaced idle sprockets 294 and 295, respectively, on a bracket arm 96 attached to the fixed framework 285. The chain then extends upwardly and is attached at its second end by a suitable attaching element 297 to the lower portion of the saddle bracket 208 on which the plunger carrying arm 200 is supported. The constant pressure of air supplied to the lower part of the cylinder 284 against the piston 288 tends to maintain the latter at the limit of its upward stroke in the cylinder, this being determined by the contact of the cam roller with the lowest portion of the plunger cam. When the plunger is raised, the air pressure in the cylinder 284 yieldingly resists such upward movement and aids to effect a uniform, relatively smooth subsequent downward movement of the plunger. It is, of course, apparent that a suitably timed control could be provided for the air supplied to the lower part of the cylinder so as to apply air to the latter only when the plunger has reached the upper end of a stroke as the upward movement of the plunger under control of its cam is not so likely to be jerky or lack smoothness as the downstroke thereof. However, the air may be applied continuously to the cylinder 284 as explained.

I claim:

1. In glass feeding apparatus, a glass container having a discharge outlet in its bottom in position to be submerged by molten glass in the container, a vertical refractory implement depending in the glass in the container with its lower end in working relation to said outlet, supporting and operating means for the implement comprising a vertically movable arm carrying the implement, a rotating cam having an open peripheral cam track, a cam roll, and motion transmitting mechanism of a lever-and-linkage type positioning said cam roll on said peripheral cam track and operatively connecting the roll with the vertically movable implement-carrying arm, a vertical air cylinder mounted in a relatively fixed position adjacent to the vertically movable arm, said cylinder having an intake connection at its lower end for air under pressure and an air exhaust connection or vent at its upper end, a vertically reciprocable piston in said cylinder, said piston having a depending rod projecting below the cylinder, an idle sprocket mounted on the lower end of said rod to turn about a horizontal axis, a pair of horizontally spaced additional idle sprockets, each turnable about a horizontal axis, and each having a relatively fixed position located below the level of the idle sprocket on said rod and also below the level of said vertically movable arm, and a chain trained over the idle sprocket on said rod and then downwardly and underneath said additional idle sprockets and being attached at one end to a fixed support at a point located below the level of the idle sprocket on the rod and at its opposite end to said vertically movable arm, whereby a downward pull will be exerted from the piston rod through said chain to said vertically movable arm when air under pressure is supplied to the lower end of the cylinder and urges the piston therein upwardly in said cylinder, to maintain said cam roll continuously in steady contact with the peripheral cam track of the cam and aid each downward stroke under control of said cam of the refractory implement that is carried by said vertically movable arm.

2. In glass feeding apparatus, a glass container having a discharge outlet in its bottom, a vertical refractory implement depending in the container in working relation to the outlet, supporting and operating means for the implement comprising a vertically adjustable tubular shaft located at one side of the container, a supporting arm mounted on the upper end of said shaft and supporting said implement, said tubular shaft having a vertically slotted portion, a transversely disposed pin in the vertically slotted portion in the shaft having end portions projecting from opposite sides thereof, said pin having a threaded vertical opening through its middle portion, a threaded rod in the shaft engaged with said vertical opening in said pin, an inner rotary tube in said tubular shaft pinned to said threaded rod, means mounting said inner tube for rotation independently of said tubular shaft and so as to move the tubular shaft vertically when said inner tube is moved vertically, a rotary adjusting rod having a vertically fixed position and being feathered to said inner tube to rotate the latter to move it vertically relative to the adjusting rod, means to rotate said adjusting rod, a cam mounted to rotate about a horizontal axis adjacent to said tubular shaft, and a lever and linkage system operatively connected to the projecting end portions of said pin and arranged to be actuated by said cam on rotation of the latter about its horizontal axis to raise said tubular shaft vertically during part of each cycle of rotation of the cam and to permit downward movement of said tubular shaft during another part of said cycle of rotation.

References Cited in the file of this patent

UNITED STATES PATENTS

| Number | Name | Date |
|---|---|---|
| 1,462,491 | Miller | July 24, 1923 |
| 1,582,725 | Bethel et al. | Apr. 27, 1926 |
| 1,643,408 | Fornaca | Sept. 27, 1927 |
| 1,760,254 | Peiler | May 27, 1930 |
| 1,761,372 | Stenhouse | June 3, 1930 |
| 1,781,340 | Peiler | Nov. 11, 1930 |
| 1,820,508 | Sylvester | Aug. 25, 1931 |
| 1,835,553 | Barker | Dec. 8, 1931 |
| 1,878,536 | Peiler et al. | Sept. 20, 1932 |
| 1,884,967 | Algeo et al. | Oct. 25, 1932 |
| 2,470,558 | Honiss | May 17, 1949 |